United States Patent
Williams

(10) Patent No.: US 10,880,275 B2
(45) Date of Patent: *Dec. 29, 2020

(54) SECURE ANALYTICS USING HOMOMORPHIC AND INJECTIVE FORMAT-PRESERVING ENCRYPTION

(71) Applicant: Enveil, Inc., Fulton, MD (US)

(72) Inventor: Ellison Anne Williams, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/876,014

(22) Filed: Jan. 19, 2018

(65) Prior Publication Data

US 2018/0212775 A1 Jul. 26, 2018

Related U.S. Application Data

(60) Provisional application No. 62/448,890, filed on Jan. 20, 2017, provisional application No. 62/448,918, (Continued)

(51) Int. Cl.
*H04L 9/32* (2006.01)
*H04L 9/00* (2006.01)
(Continued)

(52) U.S. Cl.
CPC .... *H04L 63/0428* (2013.01); *G06F 16/90335* (2019.01); *G06F 16/951* (2019.01);
(Continued)

(58) Field of Classification Search
CPC ... H04L 63/0428; H04L 9/008; H04L 9/0643; H04L 9/3226; H04L 9/3242;
(Continued)

(56) References Cited

U.S. PATENT DOCUMENTS 5,732,390 A * 3/1998 Katayanagi ............. G10L 25/78
704/222
6,178,435 B1 1/2001 Schmookler
(Continued)

FOREIGN PATENT DOCUMENTS

| EP | 2873186B1 B1 | 3/2018 |
| JP | 5680007B2 B2 | 3/2015 |

(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.
(Continued)

*Primary Examiner* — Yonas A Bayou
(74) *Attorney, Agent, or Firm* — Carr & Ferrell LLP

(57) ABSTRACT

Secure analytics using homomorphic and injective format-preserving encryption are disclosed herein. An example method includes encoding an analytic parameter set using a homomorphic encryption scheme as a set of homomorphic analytic vectors; transmitting the set of homomorphic analytic vectors to a server system; and receiving a homomorphic encrypted result from the server system, the server system having utilized the homomorphic encryption scheme and a first injective, format-preserving encryption scheme to evaluate the set of homomorphic analytic vectors over a datasource.

17 Claims, 5 Drawing Sheets

Related U.S. Application Data filed on Jan. 20, 2017, provisional application No. 62/448,893, filed on Jan. 20, 2017, provisional application No. 62/448,906, filed on Jan. 20, 2017, provisional application No. 62/448,908, filed on Jan. 20, 2017, provisional application No. 62/448,913, filed on Jan. 20, 2017, provisional application No. 62/448,902, filed on Jan. 20, 2017, provisional application No. 62/448,896, filed on Jan. 20, 2017, provisional application No. 62/448,899, filed on Jan. 20, 2017, provisional application No. 62/462,818, filed on Feb. 23, 2017.

(51) Int. Cl.

| | | |
|---|---|---|
| *H04L 29/06* | (2006.01) | |
| *G06F 21/30* | (2013.01) | |
| *G06F 21/62* | (2013.01) | |
| *H04L 9/06* | (2006.01) | |
| *G06F 16/951* | (2019.01) | |
| *G06F 16/903* | (2019.01) | |
| *G09C 1/00* | (2006.01) | |

(52) U.S. Cl.

CPC ...... *G06F 21/6245* (2013.01); *G06F 21/6254* (2013.01); *G09C 1/00* (2013.01); *H04L 9/008* (2013.01); *H04L 9/0643* (2013.01); *H04L 9/3226* (2013.01); *H04L 9/3242* (2013.01); *G06F 21/30* (2013.01); *H04L 2209/12* (2013.01)

(58) Field of Classification Search

CPC ............. G06F 16/90335; G06F 16/951; G06F 21/6245; G06F 21/6254; G09C 1/00

See application file for complete search history.

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | McKeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1* | 6/2007 | Wang ............... H04L 9/30 380/30 |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1* | 11/2009 | Takahashi ............ G06F 7/00 380/28 |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1* | 5/2011 | Gentry ............... H04L 9/14 380/285 |
| 2011/0243320 A1* | 10/2011 | Halevi ............. H04L 9/0861 380/30 |
| 2011/0283099 A1* | 11/2011 | Nath ............... H04L 9/008 713/150 |
| 2012/0039469 A1 | 2/2012 | Mueller et al. |
| 2012/0054485 A1 | 3/2012 | Tanaka et al. |
| 2012/0066510 A1* | 3/2012 | Weinman ............ H04L 9/008 713/189 |
| 2012/0201378 A1 | 8/2012 | Nabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1* | 7/2013 | Balakrishnan ......... H04L 9/008 713/190 |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mod et al. |
| 2013/0326224 A1 | 12/2013 | Yavuz |
| 2013/0339722 A1* | 12/2013 | Krendelev ............ H04L 9/0637 713/150 |
| 2013/0339751 A1 | 12/2013 | Sun et al. |
| 2013/0346741 A1 | 12/2013 | Kim et al. |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |

(56) References Cited

U.S. PATENT DOCUMENTS

| | | |
|---|---|---|
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1* | 9/2015 | Sakamoto ............. H04L 9/3236 707/719 |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Loannidis et al. |
| 2016/0036826 A1 | 2/2016 | Pogorelik et al. |
| 2016/0072623 A1 | 3/2016 | Joye et al. |
| 2016/0105402 A1* | 4/2016 | Soon-Shiong ...... H04L 63/0428 713/164 |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1* | 6/2016 | Lastra Diaz ........ G06F 16/3334 707/739 |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1* | 12/2016 | Gilad-Bachrach ......................... G06N 3/0481 |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |

FOREIGN PATENT DOCUMENTS

| | | |
|---|---|---|
| KR | 101386294B1 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | W02018091084A1 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "GAZELLE: A Low Latency Framework for Secure Neural Network Inference", 27th USENIX Security Symposium, Aug. 15-17, 2018. pp. 1650-1668.

Williams, Ellison Anne et al., "Wideskies: Scalable Private Information Retrieval," Jun. 8, 2016, 14 pages.

Bosch et al., " Sofir: Securely Outsourced Forensic Recognition," 2014 IEEE International Conference on Acoustic, Speech and Signal Processing (ICASSP), IEEE 978-Jan. 4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

(56) References Cited

OTHER PUBLICATIONS

Bajpai et al., "A Fully Homomorphic Encryption Implementation on Cloud Computing," International Journal of & Computation Technology, ISSN 0974-2239 vol. 4, No. 8, 2014, pp. 811-816. Information.
Viejo et al., "Asymmetric homomorphisms for secure aggregation in heterogeneous scenarios," Information Fusion 13, Elsevier B.V., Mar. 21, 2011, pp. 285-295.
Patil et al, "Big Data Privacy Using Fully Homomorphic Non-Deterministic Encryption," IEEE 7th International Advance Computing Conference, Jan. 5-7, 2017, 15 pages.
Panda et al., "FPGA Prototype of Low Latency BBS PRNG," IEEE International Symposium on Nanoelectronic and Information Systems, Dec. 2015, pp. 118-123, 7 pages.
Sahu et al., "Implementation of Modular Multiplication for RSA Algorithm," 2011 International Conference on Communication Systems and Network Technologies, 2011, pp. 112-114, 3 pages.
Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.
Google Scholar, search results for "trusted execution environment database", 2 pages, Aug. 1, 2020.

\* cited by examiner

SECURE ANALYTICS USING HOMOMORPHIC AND INJECTIVE FORMAT-PRESERVING ENCRYPTION

CROSS REFERENCE TO RELATED APPLICATIONS

This application claims the benefit and priority of U.S. Provisional Application Ser. No. 62/448,890, filed on Jan. 20, 2017; U.S. Provisional Application Ser. No. 62/448,918, filed on Jan. 20, 2017; U.S. Provisional Application Ser. No. 62/448,893, filed on Jan. 20, 2017; U.S. Provisional Application Ser. No. 62/448,906, filed on Jan. 20, 2017; U.S. Provisional Application Ser. No. 62/448,908, filed on Jan. 20, 2017; U.S. Provisional Application Ser. No. 62/448,913, filed on Jan. 20, 2017; U.S. Provisional Application Ser. No. 62/448,902, filed on Jan. 20, 2017; U.S. Provisional Application Ser. No. 62/448,896, filed on Jan. 20, 2017; United States Provisional Application Ser. No. 62/448,899, filed on Jan. 20, 2017; and U.S. Provisional Application Ser. No. 62/462,818, filed on Feb. 23, 2017, all of which are hereby incorporated by reference herein, including all references and appendices, for all purposes.

FIELD OF INVENTION

The present disclosure is directed to the technical field of encryption and decryption methods and apparatus as applied to computing systems. More particularly, the present disclosure is in the technical field of homomorphic encryption methods and apparatuses.

SUMMARY

According to some embodiments, the present disclosure is directed to a method comprising: encoding an analytic parameter set using a homomorphic encryption scheme as a set of homomorphic analytic vectors; transmitting the set of homomorphic analytic vectors to a server system; and receiving a homomorphic encrypted result from the server system, the server system having utilized the homomorphic encryption scheme and a first injective, format-preserving encryption scheme to evaluate the set of homomorphic analytic vectors over the datasource.

According to some embodiments, the present disclosure is directed to a method comprising: receiving an encoded analytic parameter set that was encoded by a client system using a homomorphic encryption scheme, the encoded analytic parameter set comprising a set of homomorphic analytic vectors; utilizing the homomorphic encryption scheme and a first injective, format-preserving encryption scheme to evaluate the set of homomorphic analytic vectors over a datasource and generate a homomorphic encrypted result; and transmitting the homomorphic encrypted result to the client system.

According to some embodiments, the present disclosure is directed to a system comprising: a client system that executes a client application to: encode an analytic parameter set using a homomorphic encryption scheme as a set of homomorphic analytic vectors; transmit the set of homomorphic analytic vectors to a server system; and receive a homomorphic encrypted result; and a server system that communicatively couples with the client system and a data repository, the server system utilizing a server application programming interface to: receive the encoded analytic parameter set that was encoded by the client system using the homomorphic encryption scheme; utilize the homomorphic encryption scheme and a first injective, format-preserving encryption scheme to evaluate the set of homomorphic analytic vectors over a datasource in the data repository and generate an encrypted result; and transmit the homomorphic encrypted result to the client system.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
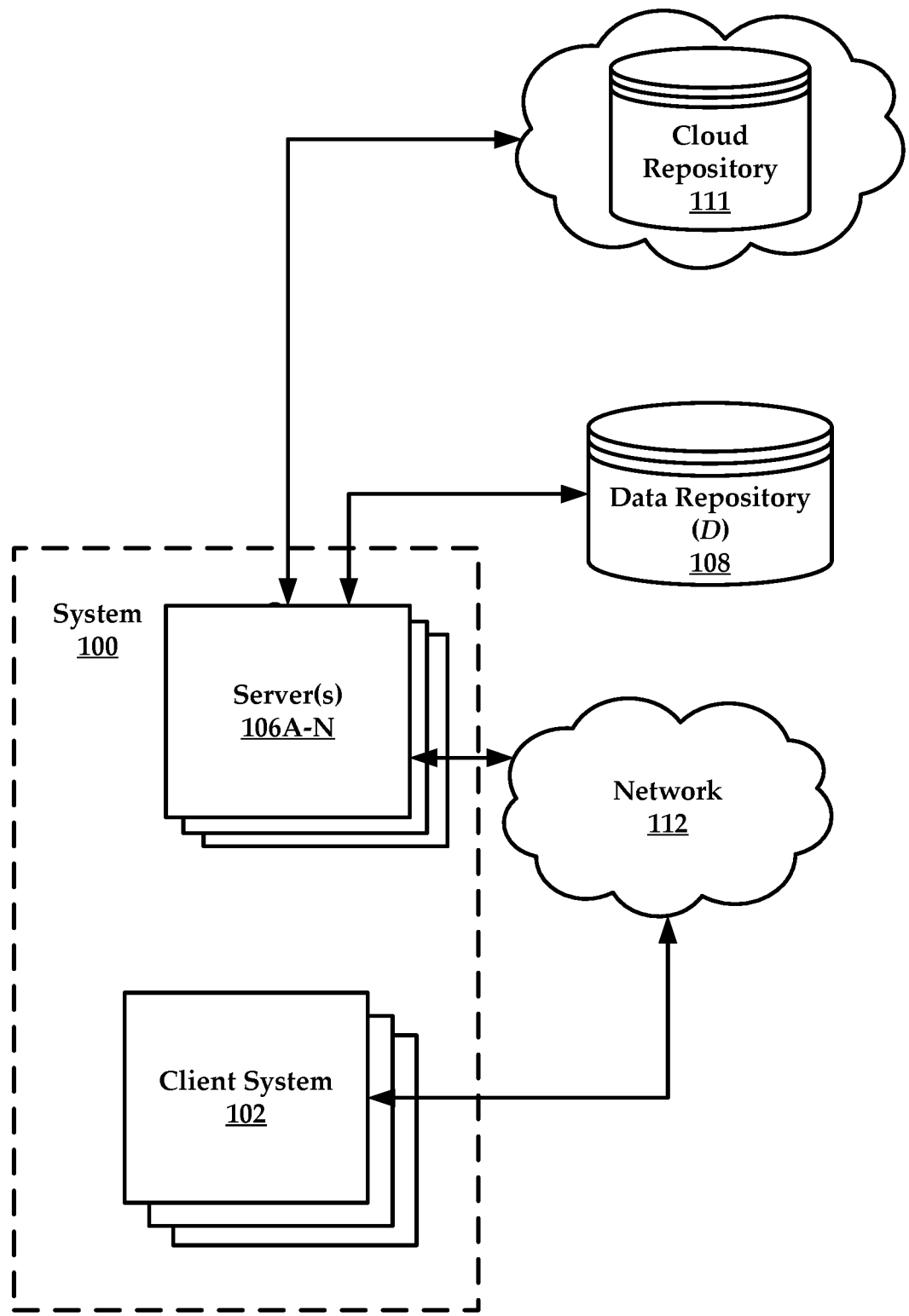
FIG. 1 is a schematic diagram of an example system that is used to practice the homomorphic encryption and injective, format preserving methods disclosed herein.

Generally speaking, the present disclosure includes systems and methods that utilize homomorphic encryption in combination with injective format-preserving encryption to accomplish secure and format-preserved analytic processing. For context, homomorphic encryption is a form of encryption in which a specific algebraic operation (generally referred to as addition or multiplication) performed on plaintext is equivalent to another operation performed on ciphertext. For example, in Partially Homomorphic Encryption (PHE) schemes, multiplication in ciphertext is equal to additional of the same values in plaintext. The systems and methods of the present disclosure can utilize any homomorphic encryption process.

Also, injective, format-preserving encryption involves one-to-one mapping between an input and the encrypted output. These methods are advantageous in the context of format-dependent processes performed by systems that depend on a consistent format for the data they receive and process. An example system that depends on format-preserved and encrypted data includes, but is not limited to, credit card processing systems. These systems prefer input having a character length that corresponds in character length to a credit card number. Thus, the format of the credit card number should be preserved, regardless of the encryption performed on the credit card number.

Other example systems that use format preserved and encrypted data include health record information systems that must comply with requirements such as HIPAA and HITECH.

In sum, embodiments of the present disclosure provide end-to-end secure query processing using homomorphic encryption and injective, format preserving encryption.

In some embodiments, the systems and methods encrypt a user query using homomorphic encryption techniques into an encrypted query vector, perform the user query with the encrypted query vector over the desired data source(s), produce encrypted results, and ultimately return those encrypted results to the user. The user can then decrypt the results using a private key used in the homomorphic encryption process.

Using the systems and methods disclosed herein, a user can perform a query over one or more datasources in a completely secure and private manner. These systems and methods never reveal contents of the query or its results to a data owner, an observer, an attacker, or any third party. The datasources over which the query may be performed may store data in plaintext format, deterministically encrypted format, semantically encrypted format, and/or other similar formats that would be known to one of ordinary skill in the art with the present disclosure before them.

In operation, these systems and methods are configured to perform end-to-end secure analytics using homomorphic and injective (format-preserving) encryption. These FPE processes are combined with homomorphic encryption techniques to enable secure analytic processing and production of analytics that have a particular format. Thus, some embodiments enable processing of an encrypted analytic over a desired data source(s) using a combination of homomorphic and injective/format-preserving encryption. Encrypted results are created and those encrypted results are returned to the user. The user can then decrypt the results using a private key that was used to homomorphically encode the query analytic.

Prior to discussion of systems and methods that combine homomorphic encryption techniques and injective (format-preserving) encryption, a discussion of homomorphic encryption techniques used to create a homomorphic query vector is provided for context.

FIG. 1 illustrates an example system 100 that is constructed in accordance with the present disclosure. The system 100 enables the creation and processing of homomorphic query vectors in order to create an encrypted result that can be decrypted by a user.

In general, the system 100 comprises a client system 102, server(s) 106A-N (could be a single server), and a data repository 108. In some embodiments, the components of the system 100 can communicate over one or more public or private networks, such as network 112. Note that there may be multiple servers corresponding to a single client system 102 in some embodiments. The server(s) 106A-N and the client system 102 may reside in varied computing environments to include a shared computing architectures, hybrid architectures, or distinct architectures such as those in a cloud computing environments.

In some embodiments, a single server can provide end-to-end secure analytics in cooperation with a plurality of client systems. In additional embodiments, a plurality of servers can provide end-to-end secure analytics in cooperation with a plurality of client systems. Thus, embodiments disclosed herein can include one-to-many relationships between client systems and servers and many-to-many relationships as well.

In general, a target datasource, such as the data repository 108 is referred to as D. Q is a desired query to be executed over the data repository 108 (e.g., a data structure stored in the data repository, such as an array or database). Just as there can be multiple servers, the data repository 108 may reside on a single server or may be distributed over multiple servers. The datasource on the data repository 108 may be unencrypted (in plaintext form), deterministically encrypted (such as Rivest-Shamir-Adleman (RSA) or some block ciphering algorithms), semantically encrypted (such as Advanced Encryption Standard (AES)), probabilistically encrypted, or any combination thereof. The data repository 108 can include a distributed data repository where data is stored in a plurality of distinct locations, which could include different blades in a server system, containers in a cloud, or servers that are geographically remote from one another, just as examples. Thus, the datasource could be partly stored on the data repository 108, partly on a cloud repository 111, or the datasource could be wholly stored on either.

Using a homomorphic encryption scheme E, such as Paillier encryption, the client system 102 encodes Q as a homomorphic query vector Q_V. Q_V is completely encrypted and Q cannot be recovered from Q_V without its private key associated with E, $K_{\{Q\_V, E\}}$. Thus, the homomorphic encryption scheme E and private key $K_{\{Q\_V, E\}}$ form a paired data set. The client system 102 retains the private key for later use.

Additional details regarding the construction of Q_V will now be described. It will be understood that Q_V is generated at the client system 102. In some embodiments, Q_V is constructed using a set of term components {T}. That is, {T} is a set of term components of the query Q extracted using a term generation function TG. For example, if Q is a database query for elements in <row:column> pairs, then {T} reflects the selection of these elements from the data repository 108.

Stated otherwise, the term generation function TG is applied to the query Q to produce terms {T} that determine what data is obtained from the data repository 108 in response to the query Q. The term generator function TG can include set of rules or parameters that are used to convert the query Q into a format that can be used by the server(s) 106A-N to fulfill the query Q over the data repository 108.

In some embodiments, a desired size of the query vector Q_V is specified as s. In some embodiments, $s > |\{T\}|$.

Next, a keyed hash function H associated with a hashing key k is applied to create a set H(T)={H(T): T in {T}}, the range of the hash H over the set of terms {T}, has a cardinality |{T}| of distinct elements. The hashing key k can include any secret that is used to seed the hashing function.

The keyed hashing function H (such as keyed-hash message authentication code (HMAC)) can be used to create cryptographic checksums in some embodiments that allow for both data verification and data authentication.

In some embodiments, the hash function H is used to process the terms {T} to remove zero value bitmasks, which would, if processed over the data repository 108, return no usable data.

Thus, for $j=0, \ldots, (s-1)$: If H(T)=j for some T in {T}, let Q_V, j=E(B_j) where B_j is a nonzero bit mask corresponding to element T; if H(T) !=j, let Q_V,j=E(0). In this manner, the query vector Q_V contains encryptions of nonzero value bitmasks for only the query terms in {T}. Thus, the terms {T} that produce zero value bitmasks are disregarded by the server system 106A-N, which reduces computing time.

Once the term generation function TG has been applied to the query Q to generate terms T, the hashing function is applied to terms T to determine nonzero value bitmasks for terms T. These processes produce a processing set or message. In some embodiments, the processing set or message comprises the query vector Q_V, the term generator function TG, and the keyed hashing function H. The processing set is transmitted from the client system 102 to the server(s) 106A-N.

The server(s) 106A-N use the homomorphic encryption scheme E and the hashing function H to extract terms {T} from the data repository 108 using the term TG. The server(s) 106A-N evaluate Q_V over the extracted terms {T} and produces encrypted results E(R).

The server(s) 106A-N transmit encrypted results E(R) back to the client system 102. The client system 102 then uses the private key $K_{\{Q\_V,\ E\}}$ associated with Q_V to decrypt E(R) and obtain the results R of the query Q. It will be understood that the results are encrypted results E(R) because the terms {T} were extracted from a query vector Q_V that was completely homomorphically encrypted and also never decrypted during use. To be sure, the only entity that retains and utilizes the private key $K_{\{Q\_V,\ E\}}$ is the client system 102.

As the query vector Q_V only contains nonzero entries for terms in {T}, the homomorphic properties of E ensure that only encrypted results corresponding to the nonzero elements of the query vector are present in R. Again, this nonzero bitmasking effect is a function of the hashing function H that was applied to the terms {T} extracted from the query Q by use of the term generator TG.

Thus, the query Q was performed over the datasource in the data repository 108 in a completely secure and private manner. Indeed, the contents of the query Q, the contents of the query vector Q_V, and/or the results R of the query Q are never revealed to the data owner, an observer, or an attacker.

According to some embodiments, the method described above for securely processing a query vector using homomorphic encryption can be augmented with aspects of injective, format-preserving encryption. In these embodiments, the process of hashing and removing nonzero values may not be present in order to allow for the use of injective, format-preserving encryption.

Stated otherwise, the use of FPE in combination with homomorphic encryption ensures that there are no error space (or false positives) in the encrypted result set as FPE schemes can be used to remove any probability of result collision due to hash collisions that might exist if a standard keyed hashing function is utilized.

For example, in some embodiments, a system end-to-end secure analytics that uses homomorphic encryption and injective, format-preserving encryption is provided. In general, this system comprises the same architecture of the system 100 of FIG. 1 with a cooperative client/server relationship.

It is understood that a particular datasource (either local or distributed) exists and a particular analytic is desired to be run against this datasource to obtain a result. As with other embodiments, a query comprises an analytic parameter set {A_P}.

Using a homomorphic encryption scheme E, such as Paillier encryption, a client system encodes the analytic parameter set {A_P} as a set of homomorphic analytic vectors {A_V}. It will be understood that the set of homomorphic analytic vectors {A_V} are completely encrypted and the analytic parameter set {A_P} cannot be recovered from {A_V} without a private key $K_{\{A\_V,H\}}$ which was used to homomorphically encrypt the analytic parameter set {A_P}.

Once the homomorphically encrypted set of homomorphic analytic vectors {A_V} is created, the set of homomorphic analytic vectors {A_V} is transmitted to the server(s), which have access to the datasource(s).

Using techniques of the homomorphic encryption scheme E and an injective, format-preserving encryption scheme F the set of homomorphic analytic vectors {A_V} is processed over the datasource(s) to produce encrypted results E(R). Specifically, the encrypted results are a homomorphic encrypted result. That is, the result that is generated is a function of the application of both homomorphic encryption and injective, format-preserving encryption.

The encrypted result E(R) is transmitted back to the client system. Using the private key associated used to encode the set of homomorphic analytic vectors {A_V}, $K_{\{A\_V,\ H\}}$, the client system decrypts encrypted result E(R) to obtain results R of the analytic A. In this instance, the results R include responses to the analytic parameter set {A_P}.

Again, it will be understood that the analytic A was performed over the datasource(s) D in a completely secure and private manner. Thus, neither the set of homomorphic analytic vectors {A_V} nor the results of the analytic A are revealed to the data owner, an observer, an attacker, or any other third-party who may have access to these data.

Figure 2:
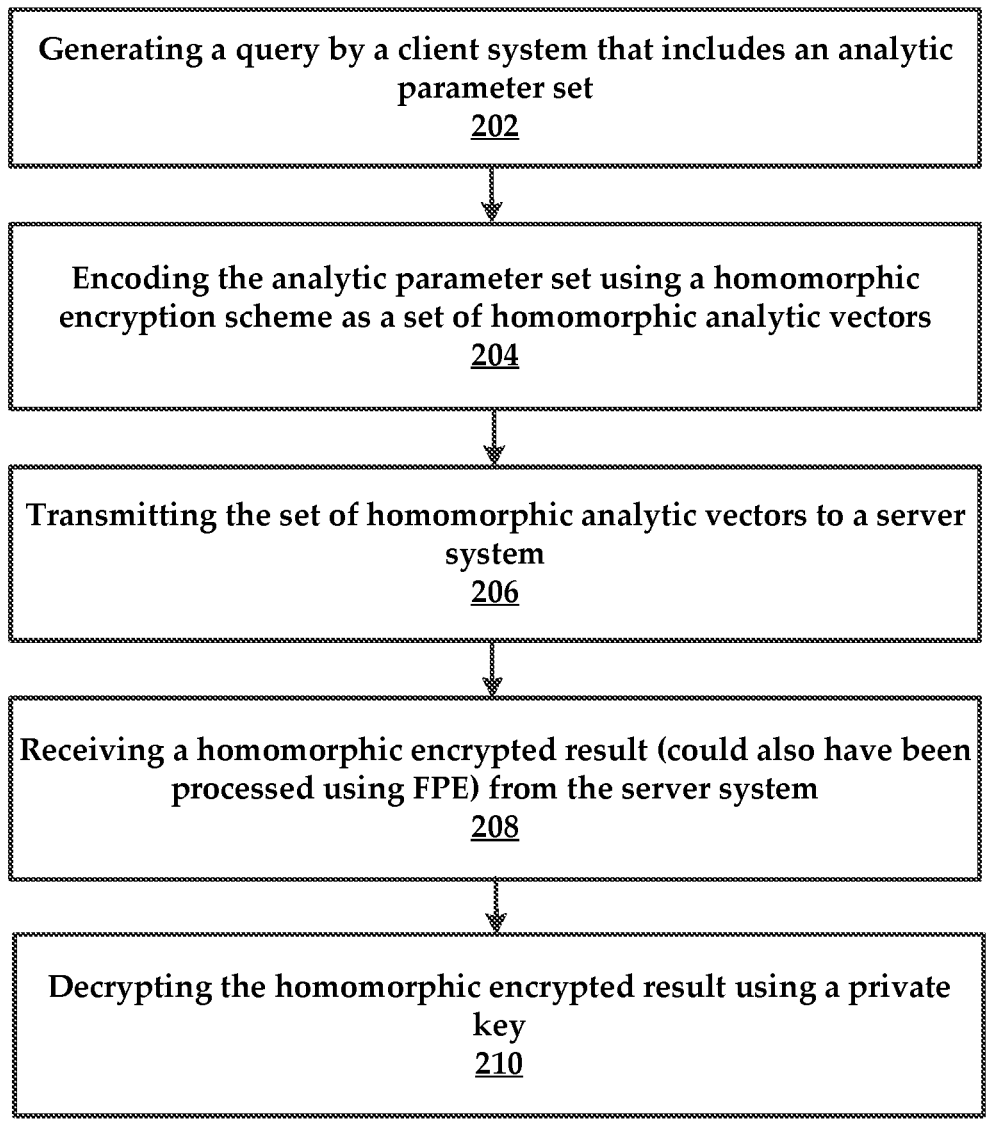
FIG. 2 is a flowchart of an example method executed by a client system.

FIG. 2 is a flowchart of an example method performed by a client system that is constructed and programmed in accordance with the present disclosure. In general, the process is initiated when a client system desires to process an analytic and an analytic parameter set.

By way of non-limiting example, the client system forms a query that is representative of a particular analytic that is of interest, such as analytics related to credit card numbers. The analytic parameter set could include, for example, a list of customers that used their credit cards for purchases over $5,000. Thus, a desired result of the query would include a list of credit card numbers that were associated with purchases over $5,000 and/or possibly names of these cardholders. This information could be executed over a datasource, such as a data repository that stores credit card purchase data. This datasource could be stored at the cloud or could be stored with a third-party system. Regardless, it is presumed that the datasource stores credit card numbers analytics related to credit card numbers.

In another example use case, the client system forms a query that is representative of a particular analytic that is of interest, such as total bandwidth usage in a cloud environment. The analytic parameter set could include, for example, a range of Internet Protocol (IP) addresses for tenants or VMs in a cloud. Thus, a desired result of the query would include a total bandwidth usage value for each of the IP addresses in the IP address range. This information could be executed over a datasource, such as a data repository that stores analytics for tenants or VMs in a cloud. This datasource could be stored at the cloud or could be stored with a third party system. Regardless, it is presumed that the datasource stores total bandwidth usage analytics and other similar analytics such as compute resources and so forth.

Again, these examples are provided merely for describing example use cases of the present disclosure and are limited in nature for purposes of clarity and brevity of description. Indeed, other use cases can be more complex, such as when the analytic parameter set requires a plurality of parameters in order to complete the analytic.

In some embodiments, the method includes a step 202 of generating a query by a client system. Again, the query comprises the analytic parameter set that is to be executed over the datasource. A user can select this analytic and analytic parameter set through GUIs generated by a user-facing application.

Next, the method includes a step 204 of encoding the analytic parameter set using a homomorphic encryption scheme as a set of homomorphic analytic vectors.

After encoding the analytic parameter set into the set of homomorphic analytic vectors, the method includes a step 206 of transmitting the set of homomorphic analytic vectors to a server system.

The server system will utilize the homomorphic encryption scheme and a first injective, format-preserving encryption scheme to evaluate the set of homomorphic analytic vectors over the datasource. This process produces a homomorphic encrypted result. In some embodiments, the encrypted results have a preserved format through use of a FPE schema. While the aspects of homomorphic encryption and FPE are suitable for use in combination, these concepts can be used separately in some embodiments.

In accordance with the present disclosure, the method can also include a step 208 of receiving the homomorphic encrypted result from the server system.

In one or more embodiments, the method includes a step 210 of the client system decrypts the homomorphic encrypted result using a private key that was used to homomorphically encrypt the analytic parameter set.

To be sure, the client system can decrypt the homomorphically encrypted result and recover the result(s) of the query. The use of a format preserving encryption scheme, when applied to the set of homomorphic analytic vectors, ensures that a structure or format of the encrypted and decrypted result matches a format of the set of homomorphic analytic vectors that were encrypted using injective FPE. Once decrypted, the result can be reviewed or otherwise used as desired.

Figure 3:
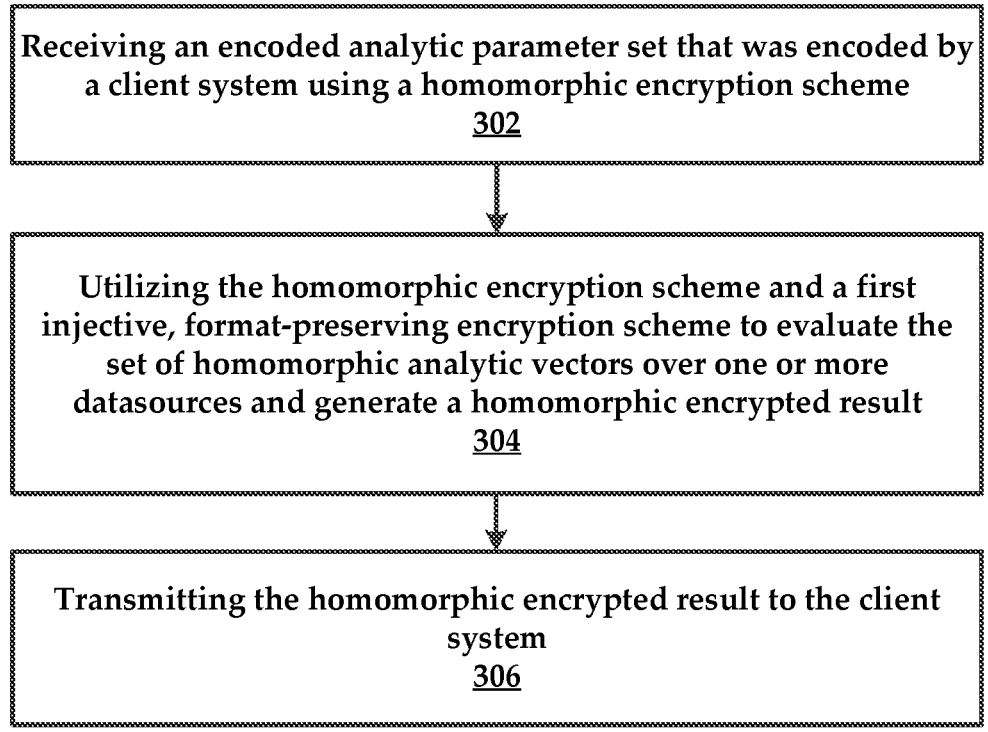
FIG. 3 is a flowchart of an example method executed by one or more server(s).

FIG. 3 is a flowchart of an example method performed by server(s) constructed and programmed in accordance with the present disclosure. In general, the process is initiated when a server system receives a set of homomorphic analytic vectors from a client system. The method for generating the set of homomorphic analytic vectors is illustrated and described with respect to the embodiments of FIG. 2 and otherwise throughout this disclosure.

In some embodiments, the method includes a step 302 of receiving an encoded analytic parameter set that was encoded by a client system using a homomorphic encryption scheme. Again, the encoded analytic parameter set comprises a set of homomorphic analytic vectors.

According to some embodiments, the method also includes a step 304 of the server(s) utilizing the homomorphic encryption scheme and a first injective, format-preserving encryption scheme to evaluate the set of homomorphic analytic vectors over one or more datasources and generate a homomorphic encrypted result. In some embodiments, if a FPE scheme is utilized, the results are both homomorphically encrypted and possess a preserved format based on the type of FPE utilized.

Next, the method includes a step 306 of transmitting the homomorphic encrypted result to the client system.

As noted above, the client system would then be able to decrypt the homomorphic encrypted result and recover the result of the initial query. Again, the use of a format preserving encryption scheme ensures that the structure or format of the encrypted result matches an initial format of the set of homomorphic analytic vectors {A_V} that were encrypted using injective FPE. Again, this combined use of homomorphic encryption and injective FPE allows for both completely secure, encrypted processing of data while at the same time maintaining format preservation for systems that require particularly formatted data.

In some optional embodiments, the analytic parameter set can be encoded with another FPE scheme or other obfuscating process such as AES, a Feistel network cipher, or other similar encryption schemes. Thus, the analytic parameter set can include plaintext content or ciphertext content. It will be understood that when the analytic parameter set includes ciphertext content, any decrypted results that include ciphertext content will require further decryption before results are accessible. That is, the client system receives an encrypted result. The client system will use its private key to decrypt (used for homomorphic encryption) the encrypted result. This result will require further decryption when the analytic parameter set includes ciphertext content. For example, if the ciphertext content was created using AES, an AES key would be applied to the recovered ciphertext content.

Figure 4:
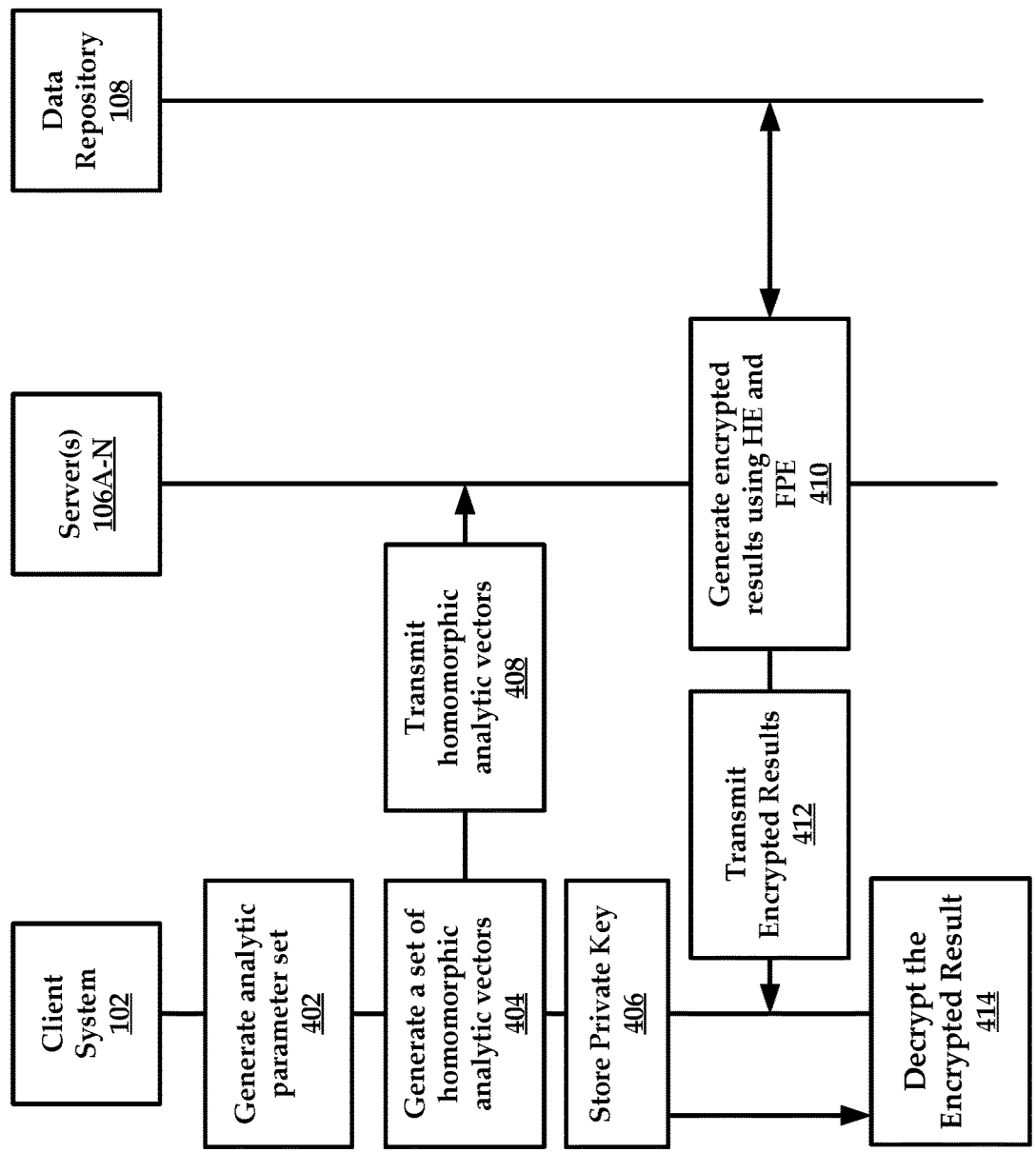
FIG. 4 is a signal flow diagram illustrating cooperative behavior between both a client system and one or more server(s) when performing a method of homomorphic and/or injective, format preserving encryption and decryption.

FIG. 4 is a signal flow diagram of an example homomorphic and injective, format preserving encryption and decryption process of the present disclosure. This process illustrates an end-to-end process executed between a client system and server(s) of the present disclosure.

In some embodiments, the client system 102 performs a set of operations such as a process of generating or specifying a query. In this instance, a query is generated that includes an analytic parameter set in process 402. The client system 102 then utilizes a homomorphic encryption scheme to generate a set of homomorphic analytic vectors in process 404. A private key 406 used to homomorphically encrypt the analytic parameter set is retained on the client system 102.

The set of homomorphic analytic vectors is transmitted to server(s) 106A-N in a transmission process 408.

The server(s) 106A-N then utilize the homomorphic encryption scheme and an injective, format-preserving encryption scheme to process the set of homomorphic analytic vectors over a datasource in a data repository 108 in process 410. This process generates an encrypted result. The server(s) 106A-N then transmit the encrypted result back to the client system 102 in transmission process 412.

The client system 102 can then decrypt the encrypted result to recover the result in process 414. Again, the result that is decrypted has a format that is preserved relative to the format of the set of homomorphic analytic vectors because injective, format-preserving encryption was utilized by the server(s) 106A-N.

Figure 5:
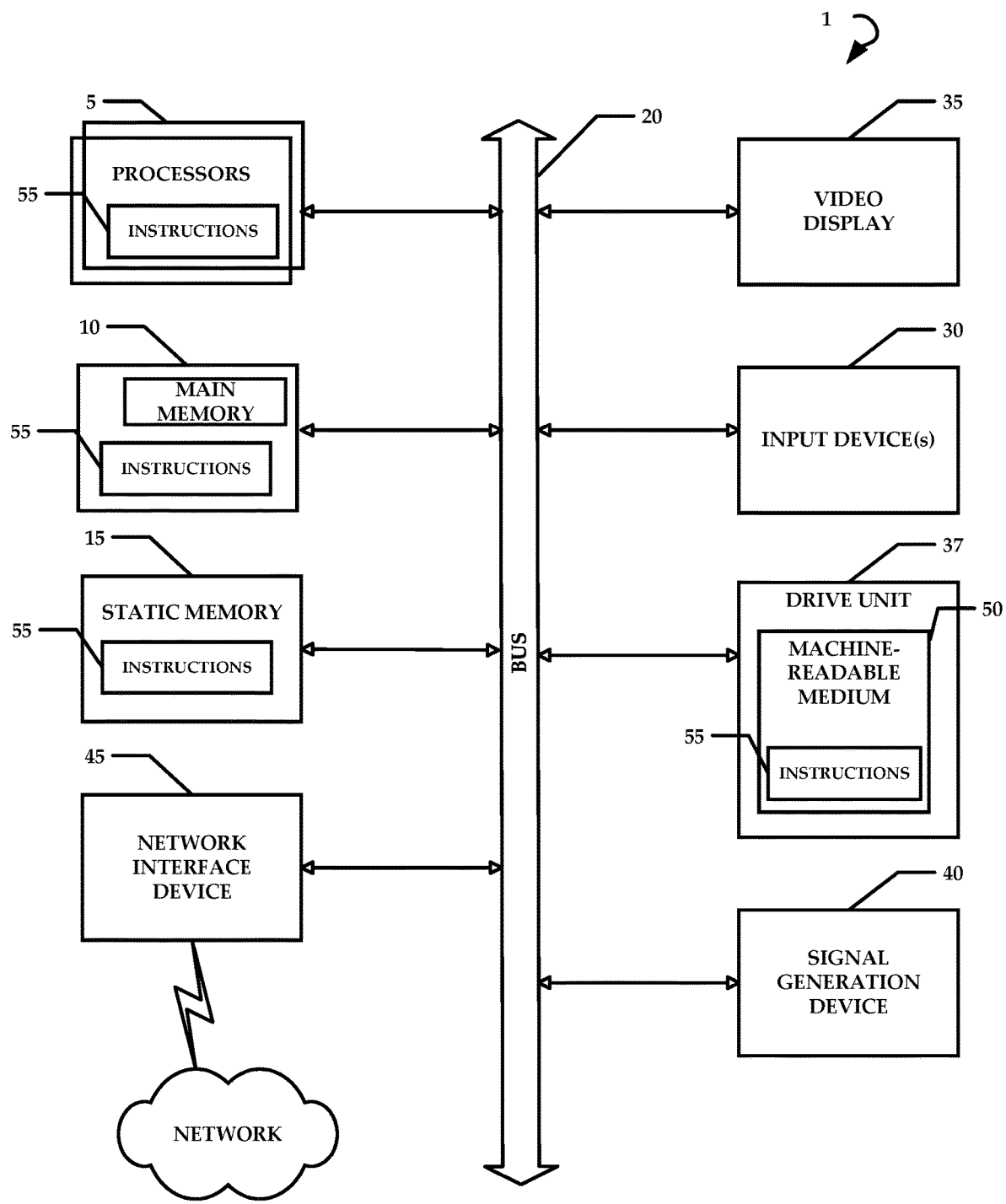
FIG. 5 illustrates an exemplary computing system that may be used to implement embodiments according to the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   encoding an analytic parameter set using a homomorphic encryption scheme as a set of homomorphic analytic vectors;
   transmitting the set of homomorphic analytic vectors to a server system; and
   receiving a homomorphic encrypted result from the server system, the server system having utilized the homomorphic encryption scheme and a first injective, format-preserving encryption scheme to evaluate the set of homomorphic analytic vectors over a datasource.

2. The method according to claim 1, further comprising decrypting the homomorphic encrypted result using a private key that was used to homomorphically encrypt the analytic parameter set.

3. The method according to claim 1, wherein the analytic parameter set, the set of homomorphic analytic vectors, and the homomorphic encrypted result are never revealed to a data owner, an observer, or an attacker.

4. The method according to claim 1, wherein the datasource may reside on a single server or may be distributed over multiple servers or in a cloud.

5. The method according to claim 4, wherein the datasource comprises unencrypted plaintext, deterministically encrypted ciphertext, semantically encrypted ciphertext, probabilistically encrypted ciphertext, and any combination thereof.

6. The method according to claim 1, further comprising:
   applying a second encryption scheme to the analytic parameter set prior to the step of encoding so that the set of homomorphic analytic vectors includes encrypted data; and
   decrypting a decrypted version of the encrypted results using a second private key of the second encryption scheme.

7. The method according to claim 1, further comprising generating a query by a client system, the query comprising the analytic parameter set that is to be executed over the datasource.

8. A method, comprising:
   receiving an encoded analytic parameter set that was encoded by a client system using a homomorphic encryption scheme, the encoded analytic parameter set comprising a set of homomorphic analytic vectors;
   utilizing the homomorphic encryption scheme and a first injective, format-preserving encryption scheme to evaluate the set of homomorphic analytic vectors over a datasource and generate a homomorphic encrypted result; and transmitting the homomorphic encrypted result to the client system.

9. The method according to claim 8, wherein the datasource may reside on a single server or may be distributed over multiple servers.

10. The method according to claim 9, wherein the datasource comprises unencrypted plaintext, deterministically encrypted ciphertext, semantically encrypted ciphertext, probabilistically encrypted ciphertext, and any combination thereof.

11. A system comprising:
a client system that executes a client application to:
encode an analytic parameter set using a homomorphic encryption scheme as a set of homomorphic analytic vectors;
transmit the set of homomorphic analytic vectors to a server system; and
receive a homomorphic and injective, format-preserving encrypted result; and
the server system that communicatively couples with the client system and a data repository, the server system utilizing a server application programming interface to:
receive the encoded analytic parameter set that was encoded by the client system using the homomorphic encryption scheme;
utilize the homomorphic encryption scheme and a first injective, format-preserving encryption scheme to evaluate the set of homomorphic analytic vectors over a datasource in the data repository and generate an encrypted result; and
transmit the homomorphic and injective, format-preserving encrypted result to the client system.

12. The system according to claim 11, wherein the client application decrypts the homomorphic encrypted result using a private key that was used to homomorphically encrypt the analytic parameter set.

13. The system according to claim 11, wherein the analytic parameter set, the set of homomorphic analytic vectors, and the homomorphic encrypted result are never revealed to a data owner, an observer, or an attacker.

14. The system according to claim 11, wherein the datasource may reside on a single server or may be distributed over multiple servers.

15. The system according to claim 14, wherein the datasource comprises unencrypted plaintext, deterministically encrypted ciphertext, semantically encrypted ciphertext, probabilistically encrypted ciphertext, and any combination thereof.

16. The system according to claim 11, wherein the client application applies a second injective, format-preserving encryption scheme to the analytic parameter set prior to the step of encoding so that the set of homomorphic analytic vectors includes injective, format-preserved encrypted data.

17. The system according to claim 11, wherein the client application generates a query by a client system, the query comprising the analytic parameter set that is to be executed over the datasource.

* * * * *